US012713378B2

(12) United States Patent
Dreiling

(10) Patent No.: US 12,713,378 B2
(45) **Date of Patent: *Aug. 18, 2026**

(54) REDUCING USER EQUIPMENT CAPABILITY MESSAGING RECEIVED BY EXTRATERRESTRIAL BASE

(71) Applicant: T-MOBILE INNOVATIONS LLC, Overland Park, KS (US)

(72) Inventor: Ryan P. Dreiling, Shawnee, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 487 days.

This patent is subject to a terminal disclaimer.

(21) Appl. No.: 18/197,320

(22) Filed: May 15, 2023

(65) Prior Publication Data

US 2024/0389050 A1 Nov. 21, 2024

(51) Int. Cl.

*H04W 60/04* (2009.01)
*H04W 8/22* (2009.01)
*H04W 12/06* (2021.01)
*H04W 84/06* (2009.01)

(52) U.S. Cl.

CPC ............. *H04W 60/04* (2013.01); *H04W 8/22* (2013.01); *H04W 12/06* (2013.01); *H04W 84/06* (2013.01)

(58) Field of Classification Search

CPC ....... H04W 60/04; H04W 8/22; H04W 12/06; H04W 84/06

See application file for complete search history.

(56) References Cited

U.S. PATENT DOCUMENTS 9,699,690 B2 * 7/2017 Palm ..................... H04L 5/0092
12,445,928 B2 * 10/2025 Speidel ............... H04W 36/305
2010/0265848 A1 * 10/2010 Kummetz ............. H04B 7/155 370/255
2018/0227904 A1 * 8/2018 Raghunathan .......... H04W 8/22
2020/0015061 A1 * 1/2020 Singh .................... H04L 5/0087
2022/0007259 A1 * 1/2022 Fujishiro ............... H04W 76/27
2022/0394657 A1 * 12/2022 Vassilovski ........... G01S 13/765
2022/0400044 A1 * 12/2022 Paz ....................... H04L 5/0053
2023/0239719 A1 * 7/2023 Cui ................... H04W 28/0215 370/329
2023/0345341 A1 * 10/2023 Speidel ................. H04W 24/04
2023/0403744 A1 * 12/2023 Deepak ................. H04W 76/18
2024/0064505 A1 * 2/2024 Liang .................. H04W 36/142
2024/0251279 A1 * 7/2024 Lee ......................... H04W 4/14

* cited by examiner

*Primary Examiner* — Brandon J Miller
(74) *Attorney, Agent, or Firm* — SHOOK, HARDY & BACON L.L.P.

(57) ABSTRACT

Embodiments of the present disclosure are directed to systems and methods for limiting user equipment (UE) capability information messaging received by an extraterrestrial base station (EBS). One or more broadcast signals are transmitted from the EBS and detected by a UE. Upon detecting the broadcast signals, the UE requests to attach to the EBS. In aspects, the EBS will first authenticate the UE's identity. Then, a capability enquiry message is transmitted to the UE specifying what information the EBS would like and requesting that carrier aggregation information not be included. The UE then sends a UE capability information message without carrier aggregation information, thereby reducing the UE capability information transmitted between the UE and the EBS.

11 Claims, 9 Drawing Sheets

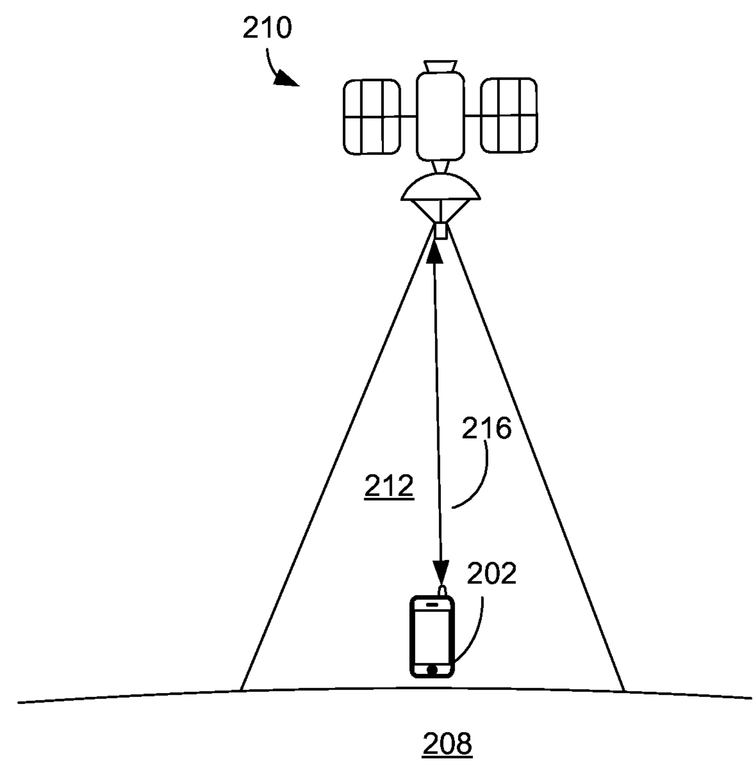
*FIG. 2A*

| Cambinaline | Malce | Band Combination Scale | IntecCallioooo Info |
|---|---|---|---|
| 2A | PCC:Band 2: FearLaqors | All Bandwidth Combine Supported | |
| 4A | PCC:Band 4: FearLaqors | All Bandwidth Combine Supported | |
| 5A | PCC:Band 5: LuaLaqors | All Bandwidth Combine Supported | |
| 7A | PCC:Band 7: LuaLaqors | All Bandwidth Combine Supported | |
| 12A | PCC:Band 12: LuaLaqors | All Bandwidth Combine Supported | |
| 13A | PCC:Band 13: LuaLaqors | All Bandwidth Combine Supported | |
| 14A | PCC:Band 14: LuaLaqors | All Bandwidth Combine Supported | |
| 17A | PCC:Band 17: LuaLaqors | All Bandwidth Combine Supported | |
| 25A | PCC:Band 25: LuaLaqors | All Bandwidth Combine Supported | |
| 26A | PCC:Band 26: LuaLaqors | All Bandwidth Combine Supported | |
| 28A | PCC:Band 28: LuaLaqors | All Bandwidth Combine Supported | |
| 38A | PCC:Band 38: LuaLaqors | All Bandwidth Combine Supported | |
| 41A | PCC:Band 44: LuaLaqors | All Bandwidth Combine Supported | |
| 41A | PCC:Band 45: LuaLaqors | All Bandwidth Combine Supported | |
| 45A | PCC:Band 55: LuaLaqors | All Bandwidth Combine Supported | |
| 55A | PCC:Band 71: LuaLaqors | All Bandwidth Combine Supported | |
| 71A | PCC:Band 2: FearLaqors | All Bandwidth Combine Supported | |
| 2C | PCC:Band 2: LuaLaqors, Fearl | All Bandwidth Combine Supported | |
| 2A-2A | PCC:Band 2: LuaLaqors, Fearl | All Bandwidth Combine Supported | |
| 2A-2A | PCC:Band 2: LuaLaqors, Fearl | 111B | |
| 2A-4A | PCC:Band 2: LuaLaqors, Fearl | 111B | |
| 2A-4A | PCC:Band 4: LuaLaqors, Fearl | 111B | |
| 2A-4A | PCC:Band 4: LuaLaqors, Fearl | 111B | |
| 2A-4A | PCC:Band 2: LuaLaqors, Fearl | 11B | |
| 2A-5A | PCC:Band 5: LuaLaqors, Fearl | 11B | |
| 2A-5A | PCC:Band 2: LuaLaqors, Fearl | 111B | |
| 2A-12A | PCC:Band 12: LuaLaqors, Fea | 111B | |
| 2A-12A | PCC:Band 2: LuaLaqors, Fearl | All Bandwidth Combine Supported | |
| 2A-45A | PCC:Band 2: LuaLaqors, Fearl | 111B | |
| 2A-55A | PCC:Band 2: LuaLaqors, Fearl | 111B | |
| 2A-55A | PCC:Band 55: LuaLaqors, Fea | 111B | |
| 2A-55A | PCC:Band 55: LuaLaqors, Fea | 111B | |
| 2A-55A | PCC:Band 2: LuaLaqors | All Bandwidth Combine Supported | |
| 2A-71A | PCC:Band 74: LuaLaqors, Fea | All Bandwidth Combine Supported | |
| 2A-71A | PCC:Band 4: LuaLaqors, Fearl | 11B | |
| 4A-4A | PCC:Band 4: LuaLaqors, Fearl | 11B | |
| 4A-4A | PCC:Band 4: LuaLaqors, Fearl | 11B | |
| 4A-5A | PCC:Band 5: LuaLaqors, Fearl | 11B | |
| 4A-12A | PCC:Band 4: LuaLaqors, Fearl | 111111B | |
| 4A-12A | PCC:Band 12: LuaLaqors, Fea | 111111B | |
| 4A-45A | PCC:Band 4: LuaLaqors, Fearl | All Bandwidth Combine Supported | |
| 4A-71A | PCC:Band 4: LuaLaqors, Fearl | All Bandwidth Combine Supported | |
| 4A-71A | PCC:Band 74: LuaLaqors | All Bandwidth Combine Supported | |
| 5D | PCC:Band 5: LuaLaqors, Fearl | 11B | |
| 5A-55A | PCC:Band 5: LuaLaqors, Fearl | All Bandwidth Combine Supported | |
| 5A-55A | PCC:Band 55: LuaLaqors, Fea | All Bandwidth Combine Supported | |
| 12A-55A | PCC:Band 12: LuaLaqors, Fea | 111111B | |
| 12A-55A | PCC:Band 55: LuaLaqors, Fea | 111111B | |
| 45A-55A | PCC:Band 55: LuaLaqors, Fea | All Bandwidth Combine Supported | |
| 55R | PCC:Band 55: Fearlaqors | All Bandwidth Combine Supported | |
| 55C | PCC:Band 55: Fearlaqors | All Bandwidth Combine Supported | |
| 55A-55A | PCC:Band 55: LuaLaqors, Fea | All Bandwidth Combine Supported | |
| 55A-55A | PCC:Band 55: LuaLaqors, Fea | All Bandwidth Combine Supported | |
| 55A-71A | PCC:Band 55: LuaLaqors, Fea | All Bandwidth Combine Supported | |
| 55A-71A | PCC:Band 55: LuaLaqors, Fea | All Bandwidth Combine Supported | |
| 2A-2A-4A | PCC:Band 2: LuaLaqors, Fearl | All Bandwidth Combine Supported | |
| 2A-2A-4A | PCC:Band 2: LuaLaqors, Fearl | All Bandwidth Combine Supported | |
| 2A-2A-4A | PCC:Band 4: LuaLaqors, Fearl | All Bandwidth Combine Supported | |
| 2A-2A-4A | PCC:Band 4: LuaLaqors, Fearl | All Bandwidth Combine Supported | |
| 2A-2A-5A | PCC:Band 2: LuaLaqors, Fearl | All Bandwidth Combine Supported | |
| 2A-2A-5A | PCC:Band 2: LuaLaqors, Fearl | All Bandwidth Combine Supported | |
| 2C-5A | PCC:Band 2: LuaLaqors, Fearl | All Bandwidth Combine Supported | |
| 2A-2A-5A | PCC:Band 5: LuaLaqors, Fearl | All Bandwidth Combine Supported | |
| 2A-2A-5A | PCC:Band 5: LuaLaqors, Fearl | All Bandwidth Combine Supported | |
| 2C-5A | PCC:Band 5: LuaLaqors, Fearl | All Bandwidth Combine Supported | |
| 2A-2A-12A | PCC:Band 2: LuaLaqors, Fearl | All Bandwidth Combine Supported | |
| 2A-2A-12A | PCC:Band 2: LuaLaqors, Fearl | All Bandwidth Combine Supported | |
| 2C-12A | PCC:Band 2: LuaLaqors, Fearl | All Bandwidth Combine Supported | |
| 2A-2A-12A | PCC:Band 12: LuaLaqors, Fea | All Bandwidth Combine Supported | |
| 2A-2A-12A | PCC:Band 12: LuaLaqors, Fea | All Bandwidth Combine Supported | |
| 2C-12A | PCC:Band 12: LuaLaqors, Fea | All Bandwidth Combine Supported | |
| 2A-4A-4A | PCC:Band 2: LuaLaqors, Fearl | All Bandwidth Combine Supported | |
| 2A-4A-4A | PCC:Band 2: LuaLaqors, Fearl | All Bandwidth Combine Supported | |
| 2A-4A-4A | PCC:Band 4: LuaLaqors, Fearl | All Bandwidth Combine Supported | |

```
supportedBandListEUTRA
{
   {
      bandEUTRA 4,
      halfDuplex FALSE
   },
   {
      bandEUTRA 12,
      halfDuplex FALSE
   },
   {
      bandEUTRA 41,
      halfDuplex FALSE
   },
   {
      bandEUTRA 2,
      halfDuplex FALSE
   },
   {
      bandEUTRA 64,
      halfDuplex FALSE
   },
   {
      bandEUTRA 5,
      halfDuplex FALSE
   },
   {
      bandEUTRA 7,
      halfDuplex FALSE
   },
   {
      bandEUTRA 13,
      halfDuplex FALSE
   },
   {
      bandEUTRA 17,
      halfDuplex FALSE
   },
   {
      bandEUTRA 25,
      halfDuplex FALSE
   },
```

*FIG. 5.*

REDUCING USER EQUIPMENT CAPABILITY MESSAGING RECEIVED BY EXTRATERRESTRIAL BASE

SUMMARY

The present disclosure is directed to improving user equipment (UE) capability information messages transmitted from a UE to an extraterrestrial base station, substantially as shown and/or described in connection with at least one of the Figures, and as set forth more completely in the claims.

According to various aspects of the technology, a user equipment actively searches for a network when it anticipates that it is located within an area of anticipated coverage by one or more extraterrestrial base stations. Though most populated areas today have at least nearly ubiquitous cellular coverage, there are many times when a UE may depart coverage or otherwise attempt to search for an extraterrestrial base station to select and attach. Generally, a UE may detect one or more broadcast signals from an extraterrestrial base station and transmit an attachment request. The extraterrestrial base station transmits a UE capability enquiry message to the UE to send specific information to the extraterrestrial base station. The UE, in response, sends a UE capability information message. Since the UE will transmit only the specific information requested in the UE enquiry message, the size of the UE capability information message is greatly reduced. This improvement leads to increased efficient use of a spectrum, better management of system capacity, keeping payloads to a minimum, and avoiding larger blocks of data that may be prone to errors.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein:

FIG. 2A illustrates a diagram of an exemplary environment in which implementations of the present disclosure may be employed;

FIG. 3 illustrates an example of LTE carrier aggregation combinations a particular UE may support, according to one or more aspects described herein;

FIG. 5 illustrates an example UE capability information message, according to one or more aspects described herein;

DETAILED DESCRIPTION

Figure 1:
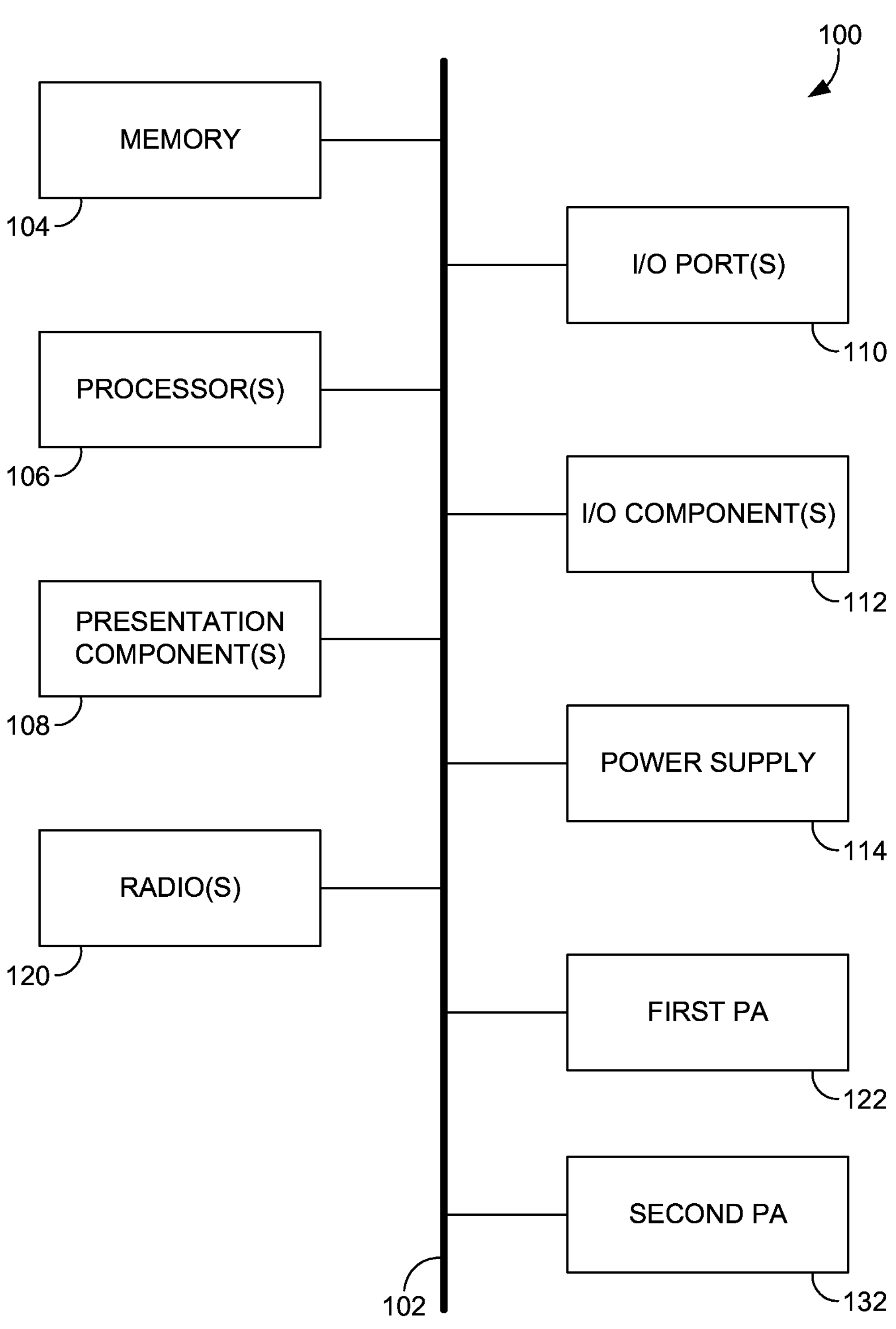
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, an extraterrestrial base station is distinguished from a terrestrial base station on the basis of its lack of ground coupling; some examples of extraterrestrial base stations include airborne (e.g., on an aircraft or airship) and satellites (e.g., low earth orbit (LEO), medium earth orbit (MEO), and geostationary orbit (GEO)). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the provision of telecommunication services is moving beyond the surface of the earth at increasing speed. Network operators, once exclusively operating terrestrial base stations, will begin to operate extraterrestrial base stations themselves or utilize third parties to service their subscribers with additional reliability and availability. In some cases, the use of an extraterrestrial base station (EBS) is planned for times when a user equipment (UE) is beyond range of a terrestrial radio access network (RAN), where UEs actively perform cell search in order to identify available cellular base stations that can be selected and used to communicate with a broader network. Cell search is a power-intense activity conducted by UEs that includes tuning to numerous different frequencies, in some cases all frequencies supported by the UE, to listen for signaling from one or more candidate base stations.

In an LTE network where the signal from the network is being broadcasted by a satellite, a single LTE carrier may be used. Conventionally, a UE may support LTE carrier aggregation, and support multiple carrier aggregation combinations. Supporting multiple carrier aggregation combinations increases the size of the UE capability information message sent from the UE to the extraterrestrial base station (e.g. a satellite). However, in satellite communication is it imperative to efficiently make use of spectrum and only send what is pertinent and keep signaling messages small to help with overall system capacity and keeping the payload at a minimum.

The UE does not send the UE capability information message unsolicited. The network first sends to the UE a UE capability enquiry message which instructs the UE which technology to report upon. Therefore, when a UE responds to a UE enquiry message from the EBS, the UE capability message size can be very large. However, in satellite communication, it is imperative to efficiency make use of spectrum and only send the relevant information to keep signaling messages small in order to help with overall system capacity and to avoid large blocks of data that may be probe to errors. In order to facilitate reduced UE capability messaging to an extraterrestrial base station, the present disclosure describes a system in which new signaling information elements (IEs) are included in the UE capability enquiry message instructing a UE not to include any carrier aggregation combinations, resulting in a smaller, more concise UE capability information message as the CA combinations and related IEs are omitted.

Additionally, in attaching to a 4G or 5G network a UE exchanges information regarding its capabilities and 4G/5G features it supports, so that the network can best utilize the features and capabilities of the UE. For example, the UE may signal to the network, via the UE capability info message, the various 4G LTE bands it supports. In turn, the network can use this information to coordinate handovers to other LTE bands and frequencies as the UE traverses the network. In the UE capability information message, there are additional, ancillary capabilities the UE may support on a band-by-band basis, such as UE Transmit Power Class, carrier bandwidth. A network will send the UE a UE capability enquiry message, which instructs the UE which technology to report on (e.g. bands). For example, the UE capability enquiry message may request the UE to report on bands 4 and 10. However, in the past, the UE would send a UE capability information message that includes capability and features for these bands and additional other bands.

In a satellite based, based LTE network, a single LTE RF band and frequency may be used. As mentioned, in satellite communication it is imperative to efficiently make use of spectrum and only send what is pertinent. Given that a single RF band may be used, it is unnecessary and wasteful of the UE to send capabilities for other bands that would not be used. The present disclosure discloses the employment of new signaling IEs (informational elements) that can be included in the UE capability enquiry message that instructs the UE to only send UE capabilities pertaining to a specified band and don't send capabilities for any other bands. The employment of new signaling IEs is an improvement to current technology and would greatly reduce the size of the UE capability information message.

Additionally, the present disclosure describes a new mechanism of exchanging information regarding what the UE supports, specifically tailored to the network. In this method, the satellite-based LTE network, in the UE Capability Enquiry message, asks for TRUE/FALSE (YES/NO) support of only the capabilities that are imperative for LTE operation and are supported by this network. As mentioned the extraterrestrial base stations may only support a single LTE band, and may not support carrier aggregation. Additionally the network may not support higher order modulation schemes such as 256 QAM. Therefore it is unnecessary and wasteful for a UE to construct a large, lengthy UE capability information message signaling support for features and capabilities that won't be used. Instead, the network can signal and ask specifically to the UE whether the UE supports certain capabilities such band X, 64QAM, or Power Class 2. By having the UE only respond back to the particular items and capabilities that the network asks for it, it greatly reduces the size of the message and makes exchanging this information more concise.

Reducing UE Capability Messaging by not Sending Carrier Aggregation Combinations Accordingly, a first aspect of the present disclosure is directed to a system for reducing user equipment (UE) capability messaging received by an extraterrestrial base station (EBS) comprising the EBS and or more computer processing components configured to perform operations including transmitting one or more signals from the first EBS. In response to the UE detecting at least one signal of the one or more signals from the first EBS, the system receives an attachment request from the UE. The UE's identity is authenticated and then a capability enquiry message is transmitted to the UE instructing the UE to send capability information without including carrier aggregation information. In response, a reduced UE capability information message without the carrier aggregation information is received. The one or more computer processing components are further configured to grant permission to the UE to attach to the extraterrestrial base station.

A second aspect of the present disclosure is directed to a method for reducing user equipment capability messaging received by an extraterrestrial base station. The method comprises transmitting one or more signals from the EBS and receiving an attachment request from the UE. The method further includes authenticating an identity associated with the UE and transmitting a capability enquiry message to the UE instructing the UE to send capability information without including carrier aggregation information. The method further includes receiving a reduced UE capability information message without the carrier aggregation information.

Another aspect of the present disclosure is directed to a system for reducing UE capability messaging received by an EBS comprising the EBS configured to broadcast signals on a single RF band for a single carrier and one or more computer processing components configured to perform a variety of operations. The one or more computer processing components are configured to transmit one or more reference signals from the EBS. In response to a UE detecting at least one reference signal from the EBS and as a result of the UE failing to connect to a terrestrial base station, the one or more computer processing components are configured to receive an attachment request from the UE and then transmit a capability enquiry message to the UE comprising signaling instructional elements that instruct the UE to send capability information without including carrier aggregation information. In response, a UE capability information message without carrier aggregation information from the UE is received, wherein the UE capability information message comprises information related to the single RF band supported by the EBS.

Single Carrier Reporting in UE Capability Information Message

Another aspect of the present disclosure is directed to systems and methods for limiting UE capability information messaging received by an EBS to a single RF band. The system comprises an EBS configured to broadcast signals on a single RF band for a single carrier and one or more computer processing components configured to perform a series of operations. The one or more computer processing components are configured to transmit one or more broadcast signals from the EBS. In response to the UE detecting at least one broadcast signal from the one or more broadcast signals transmitted from the EBS, the one or more computer processing components is configured to receive an attachment request from the UE and authenticating an identity of the UE. The one or more computer processing components further transmit a capability enquiry message to the UE instructing the UE to send capability information corresponding solely to the single RF band for which the EBS is configured. A UE capability information message from the UE comprising information corresponding solely to the single RF band associated with the extraterrestrial base station is received in response.

Another aspect of the present disclosure is directed to a system for limiting UE capability information messaging received by an EBS to a single RF band comprising the EBS configured to broadcast signals on a single RF band for a single carrier and one or more computer processing components configured to perform operations comprising transmitting one or more broadcast signals from the EBS. The one or more computer processing components receiving an attachment request from the UE in response to a UE detecting at least one broadcast signal from the EBS and as a result of the UE failing to connect to a terrestrial base station. A capability enquiry message is transmitted to the UE comprising signaling instructional elements that instruct the UE to send capability information corresponding solely to the single RF band supported by the EBS. A UE capability information message comprising information corresponding solely to the single RF band associated with the EBS is received and a signal is transmitted to the UE permitting the UE to attach to the EBS.

Explicit UE Capability Request to Reduce UE Capability Info Request Message

According to another aspect of the technology described herein, systems and methods for requesting explicit UE capability information is disclosed. The system comprises an EBS configured to support one frequency band and one or more computer processing components configured to perform a variety of operations comprising transmitting one or more signals from the extraterrestrial base station to a UE. The system receives an attachment request from the UE in response to the UE detecting the one or more signals and transmits a UE capability enquiry message to the UE instructing the UE to send reduced capability information limited to the one frequency band supported by the EBS. A reduced UE capability information message comprising capability information related only to the at least one frequency band supported by the EBS is received.

In yet another aspect of the technology described herein, systems and methods for requesting explicit UE capability information is disclosed. The system comprises an EBS supporting a single RF band and one or more computer processing components configured to perform operations comprising transmitting one or more reference signals from EBS to a UE and receiving an attachment request from the UE. The system authenticates the identity of the UE, and transmits a capability enquiry message to the UE comprising signaling instructional elements that instruct the UE to respond to a plurality of questions comprising whether the UE supports a specific band identified, whether the UE supports 64QAM, and whether the UE supports Power Class 2. The system receives a UE capability information message solely comprising responses to the plurality of questions and transmits a message to the UE allowing the UE to attach to the extraterrestrial base station.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link. Though one radio is shown, it is expressly conceived that a computing device with a two radios could facilitate communication over one or more wireless links with one or more wireless networks via both the first transmitter 122 and the second transmitter 132. Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VOLTE, or other VOIP communications. In aspects, the radio 120 may be configured to communicate using the same protocol but in other aspects they may be configured to communicate using different protocols. In some embodiments, including those that both radios or both wireless links are configured for communicating using the same protocol, the radio 120 and may be configured to communicate on distinct frequencies or frequency bands (e.g., as part of a carrier aggregation scheme). As can be appreciated, in various embodiments, the radio 120 can be configured to support multiple technologies and/or multiple frequencies; for example, the first radio 120 may be configured to communicate with a base station according to a cellular communication protocol (e.g., 4G, 5G, 6G, or the like).

Turning now to FIG. 2A, an exemplary network environment is illustrated in which implementations of the present disclosure may be employed. Such a network environment is illustrated and designated generally as network environment 200. At a high level the network environment 200 comprises UE 202 that is at or near ground level of the earth 208, and extraterrestrial base station 210. Though the extraterrestrial base station in FIG. 2A is illustrated as being satellites, it should be understood that the present disclosure is not limited to space-based implementations and the extraterrestrial base station 210 may be in the form of an aircraft or any other non-terrestrial base station. Similarly, though UE 202 is illustrated as a cellular phone, a UE 202 suitable for implementations with the present disclosure may be any computing device having any one or more aspects described with respect to FIG. 1.

Extraterrestrial base station 210 may have any one or more characteristics suitable for use in a wireless telecommunication network environment such as network environment 200. As in the illustrated embodiment, the EBS 210 may take the form of a satellite. Generally, a satellite is characterized by its orbit around the earth. The orbit of any particular satellite will vary by operator desire and/or intended use; for example, a satellite base station suitable for use with the present disclosure may be characterized by its maximum orbital altitude and/or orbital period as Low Earth Orbit (LEO), Medium Earth Orbit (MEO), and High Earth Orbit (HEO). Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous on the basis that its orbital period is approximately equal to the length of a sidereal or solar day (approximately 24 hours); generally, a satellite in geosynchronous orbit will appear to be in the same position relative to a fixed point on the surface of the earth 208 at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth 208.

Extraterrestrial base station 210 is configured to wirelessly communicate UEs, such as UE 202. In aspects, each of the EBS may communicate with a UE 202 using any wireless telecommunication protocol desired by a network operator, including but not limited to 3G, 4G, 5G, 6G, 802.11x and the like. Though not illustrated so as not to obscure the present disclosure, the EBS 210 may have a wireless connection to one or more ground stations, wherein signals are communicated from a centralized radio station to one or more EBS so that they may be relayed to UEs on the surface of the Earth 208. In addition to a wireless telecommunication link (also referred to herein as simply a "wireless link") with one or more ground stations, the EBS 210 is configured to wirelessly communicate with one or more UEs on the surface of the Earth 208. For example, the EBS 210 may establish a wireless link 216 with UE 202. Though illustrated as a two-way communication link, the wireless link 216 may be one-way (i.e., downlink only or uplink only) instead of bi-directional (i.e., downlink and uplink). The EBS 210 may be said to provide wireless telecommunication coverage to a geographic area as illustrated in FIG. 2S where the EBS 210 may be said to serve a first geographic coverage area 212.

In order to connect to any base station, regardless of whether it is terrestrial or extraterrestrial, a UE must perform an active search to determine which base stations, if any, it is capable of connecting to. This process is known to many in the art and referred to herein as a 'cell search,' and generally comprises acquiring time and frequency synchronization with a cell associated with a base station and detecting an identity of that cell by tuning to one or more specific frequencies, detecting/decoding synchronization signals, detecting/decoding a physical broadcast channel (PBCH), and detecting/decoding the physical downlink shared channel (PDSCH). When performing the cell search, a particular UE typically actively scans frequency bands in which it is capable of communicating for synchronization signals from a base station. Upon detection of synchronization signals from one or more base stations, the UE will perform a cell selection procedure (typically based on best quality of service metrics), perform an attachment procedure with the base station, and then being carrying out a wireless communication session.

Figure 2B:
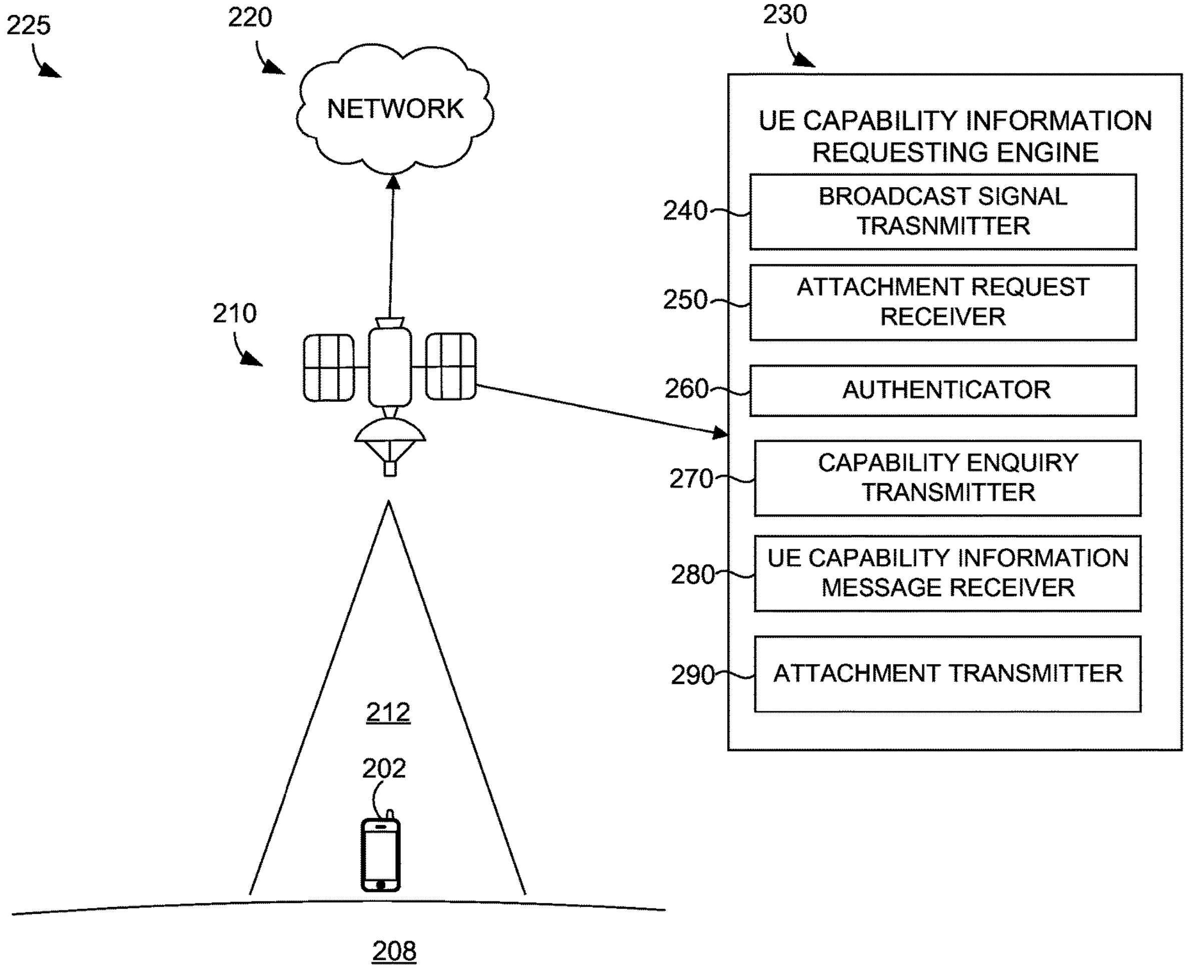
FIG. 2B illustrates an exemplary network environment in which implementations of the present disclosure may be employed.

Turning now to FIG. 2B, network environment 225 is an exemplary network environment in which implementations of the present disclosure may be employed. Network environment 225 is one example of a suitable network environment and is not intended to suggest any limitation as to the scope of use or functionality of the present disclosure. Neither should the network environment be interpreted as having any dependency or requirement relating to any one or combination of components illustrated.

Network environment 225 includes UE 202 (network environment 225 may contain more UEs), network 220, UE Capability Information Requesting Engine 230, and extraterrestrial base station 210. In the network environment 225, UE 202 may take on a variety of forms, such as a PC, a UE, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with an EBS 210 in order to interact with network 220, which may be a public or a private network. While one UE 202 is shown in FIG. 2A, UE 202 may be referred to as one or more UEs as it is contemplated that there may be multiple UEs present in other embodiments.

In some aspects, the UE 202 corresponds to a UE or a computing device. For example, the UE may include a display(s), a power source(s) (e.g., a battery), a data store(s), a speaker(s), memory, a buffer(s), a radio(s), and the like. In some implementations, the UE 202 comprises a wireless or mobile device with which a wireless telecommunication network(s) may be utilized for communication (e.g., voice and/or data communication). In this regard, the UE may be any mobile computing device that communicates by way of a wireless network, for example, a 3G, 4G, 5G, LTE, CDMA, or any other type of network.

In some cases, the UE 202 in network environment 225 may optionally utilize network 220 to communicate with other computing devices (e.g., a mobile device(s), a server(s), a personal computer(s), etc.) through EBS 210. The network 220 may be a telecommunications network(s), or a portion thereof. A telecommunications network might include an array of devices or components (e.g., one or more base stations), some of which are not shown. Those devices or components may form network environments similar to what is shown in FIG. 2A and may also perform methods in accordance with the present disclosure. Components such as terminals, links, and nodes (as well as other components) may provide connectivity in various implementations. Network 220 may include multiple networks, as well as being a network of networks, but is shown in more simple form so as to not obscure other aspects of the present disclosure.

Network 220 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 220 may be associated with a telecommunications provider that provides services (e.g., LTE) to the UE 202. Additionally or alternatively, network 220 may provide voice, SMS, and/or data services to UEs or corresponding users that are registered or subscribed to utilize the services provided by a telecommunications provider. Network 220 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 220 may also be, in whole or in part, or have characteristics of, a self-optimizing network.

In some implementations, EBS 210 is configured to communicate with the UE 202 that is located within the geographical area defined by a transmission range and/or receiving range of EBS 210. The geographical area may be referred to as the "coverage area" of the cell site or simply the "cell," as used interchangeably hereinafter. EBS 210 may include one or more base stations, base transmitter stations, radios, antennas, antenna arrays, power amplifiers, transmitters/receivers, digital signal processors, control electronics, GPS equipment, and the like. In particular, EBS 210 may be configured to wirelessly communicate with devices within a defined and limited geographical area.

As shown, extraterrestrial base station 210 is in communication with the UE capability information requesting engine 230, which comprises a broadcast signal transmitter 240, an attachment request receiver 250, an authenticator 260, a capability enquiry transmitter 270, a UE capability information message receiver 280, and an attachment transmitter 290. While the UE capability information requesting engine 230 is shown to have 6 components, it is contemplated that fewer or more components may be present in other aspects.

The broadcast signal transmitter 240 transmits one or more broadcast signals from the extraterrestrial base station 210 to the UE 202. The signals are transmitted within a determined geographic area and allow a user device, located on land, to detect the devices. When a UE detects at least one broadcast signal transmitted from the EBS 210, a UE such as UE 202, will send an attachment request to the EBS 210. For the purposes of this disclosure, the example EBS 210 supports LTE. However, it is contemplated that the EBS 210 may be configured to support other wireless technology as well. In some aspects, the UE 202 may automatically request to attach to the EBS 210 upon receiving broadcast signals from the EBS 210 which occur when the UE 202 is within a predetermined area in which the broadcast signals from the EBS 210 reach. In other aspects, a UE 202 may first try to attach to a terrestrial base station and upon failing to do so, may search for broadcast signals from an EBS 210. It is contemplated that the UE 202 may utilize mobile network code that provides a ranking of base stations for attachment when determining whether to send an attachment request.

The attachment request receiver 250 receivers the attachment request from the UE 202 and initiates an authentication process between the EBS 210 and the UE 202. The authentication process is conducted by the authenticator 260 and may comprise several transmission of signals between the EBS 210 and the UE 202. Once the identity of the UE 202 is authenticated, a capability enquiry message is transmitted by a capability enquiry transmitter 270 to the UE 202. The capability enquiry transmitter 270, via the capability enquiry message, instructs the UE 202 to send only specific capability information that is relevant to the EBS 210. While UEs, such as UE 202, may support carrier aggregation and multiple RF bands, the EBS 210 does not. Therefore, the capability enquiry transmitter 270 may request information from the UE 202 comprising solely the single RF band for which the EBS 210 is configured for.

In some aspects, the capability enquiry transmitter 270 may transmit a capability enquiry message to the UE 202 comprising signaling instructional elements that instruct the UE 202 to send capability information corresponding solely to the single RF band that is supported by the EBS 210. In other aspects, the capability enquiry transmitter 270 may specifically request capability information regarding the UE 202, but instruct that no carrier aggregation information be sent. In yet other aspects, the capability enquiry transmitter 270 may specifically request reduced capability information that is limited to the one frequency band supported by the EBS 210. It is further contemplated that in some aspects, the capability enquiry transmitter 270 may include a plurality of questions related to the UE's capabilities in the enquiry message. The plurality of questions may questions that the UE 202 can respond in the capability information message with a yes or a no. For example, the capability enquiry message may comprise instructional elements that instruct the UE 202 to respond to a plurality of questions comprising whether the UE 202 supports a specific band identified, whether the UE 202 supports 64QAM, and whether the UE 202 supports Power Class 2.

After the UE 202 receives the enquiry, the UE transmits a UE capability information message that is received by the UE capability information message receiver 280 to be analyzed by the EBS 210 to determine whether the UE 202 may attach to the EBS 210. If the UE capability enquiry message did not specify that the only information requested from UE 202 is the information related to the specific RF band supported by the EBS 210, then the UE capability information message would include significant additional information such as that seen in FIG. 3. In aspects, following the determination by the EBS 210 regarding whether the UE 202 can attach to the EBS 210 based on the UE capability information message received, the EBS 210, via an attachment transmitter 290, may transmit a signal informing the UE 202 that it has permission to attach to the EBS 210. Additionally, in aspects, the UE capability information requesting engine 230 may also confirm that the UE 202 has attached to the EBS 210.

By limiting the information sent in the UE capability information message to the single RF band associated with the EBS 210, bandwidth resources are saved, which results in more efficient usage of the EBS 210. Additionally, providing information corresponding solely to the single RF band associated with the extraterrestrial base station improves a network's capacity. The limited information send in the UE capability information message also decrease the risk of transmitting incorrect information to the EBS 210.

Turning to FIG. 3, an illustration of a chart 300 listing the number of LTE combinations that a particular UE may support is illustrated. In Attaching to a 4G or 5G network the UE, such as UE 202, exchanges information regarding its capabilities and 4G/5G features it supports, so that the network can best utilize the features and capabilities of the UE. For example, the UE may signal to the network, via the UE capability information message, that it supports various carrier aggregation combinations. Thus, the network can logically then configure multiple carriers to multiplex and aggregate different RF carriers for data transmission. Therefore, depending on the number of bands and features of the UE, the list of support carrier aggregations combinations can be quite lengthy and extensive.

As noted, when a UE receives an enquiry message from an EBS, the UE will respond with a capability information message. Previously, a UE may receive an enquiry message from the EBS, but would reply with information regarding the various carrier aggregations supported, which would lead to a lengthy UE capability information message transmitted to the EBS. Since the EBS only supports a single LTE carrier, this additional irrelevant information regarding carrier aggregation is not desired. With satellite communication, it is critical to efficiently make sue of the spectrum and only send the information that is necessary so that messages are kept concise and short as this helps with system capacity and avoids sending large blocks of data that might be prone to errors. As such, the employment of signaling information elements discussed herein, that can be included in the UE enquiry message, specifically instructs the UE to not include any carrier aggregation combinations. In response, the UE can send a smaller, more concise UE capability information message where carrier aggregation combinations are omitted, thereby improving the effective use of the spectrum, improving optimal system capacity use, and decreasing the chances of errors.

Figure 4:
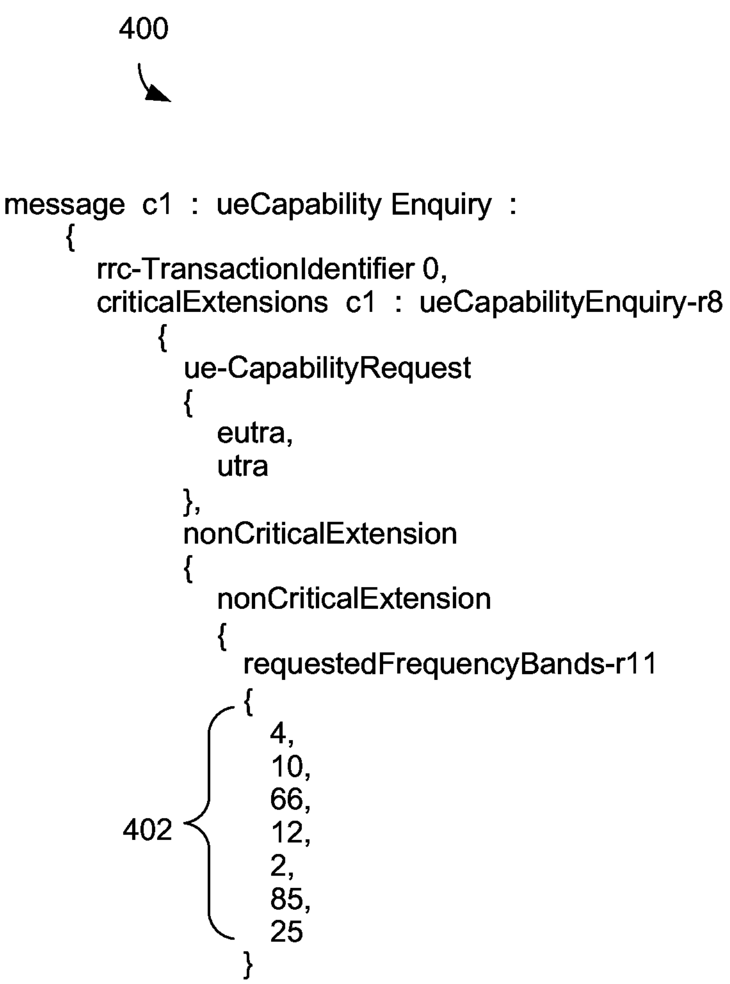
FIG. 4 illustrates an example UE capability enquiry message, according to one or more aspects described herein.

FIG. 4 illustrates an example UE capability enquiry message 400 that may be transmitted from the EBS to a UE as disclosed herein. In this example, the UE capability enquiry message 400 instructs the UE which technology to report on including which bands and other configurations are relevant for the particular extraterrestrial base station. In this particular UE capability enquiry message, the network is requesting the UE to report on bands 4, 10, 66, 12, 2, 85, 25. In response, the UE sends the UE capability information message 500 seen in FIG. 5. However, the UE capability information message 500 actually includes capabilities and features for these bands and others such as band 41 and 17. As mentioned, employing new signaling IEs (informational elements) that are included in the UE capability enquiry message that instructs the UE to only send UE capabilities pertaining to a specified band and don't send capabilities for any other bands will resolve this issue and greatly reduce the size of the UE capability information message 500 so that only the requested information is sent to the extraterrestrial base station. Application of the technology disclosed herein would result in the UE carrier capability information message being limited to only the bands requested (e.g. 4, 10, 66, 12, 2, 85 and 25 in FIG. 4). This improvement will eliminate unnecessary and irrelevant information received by the EBS.

Figure 6:
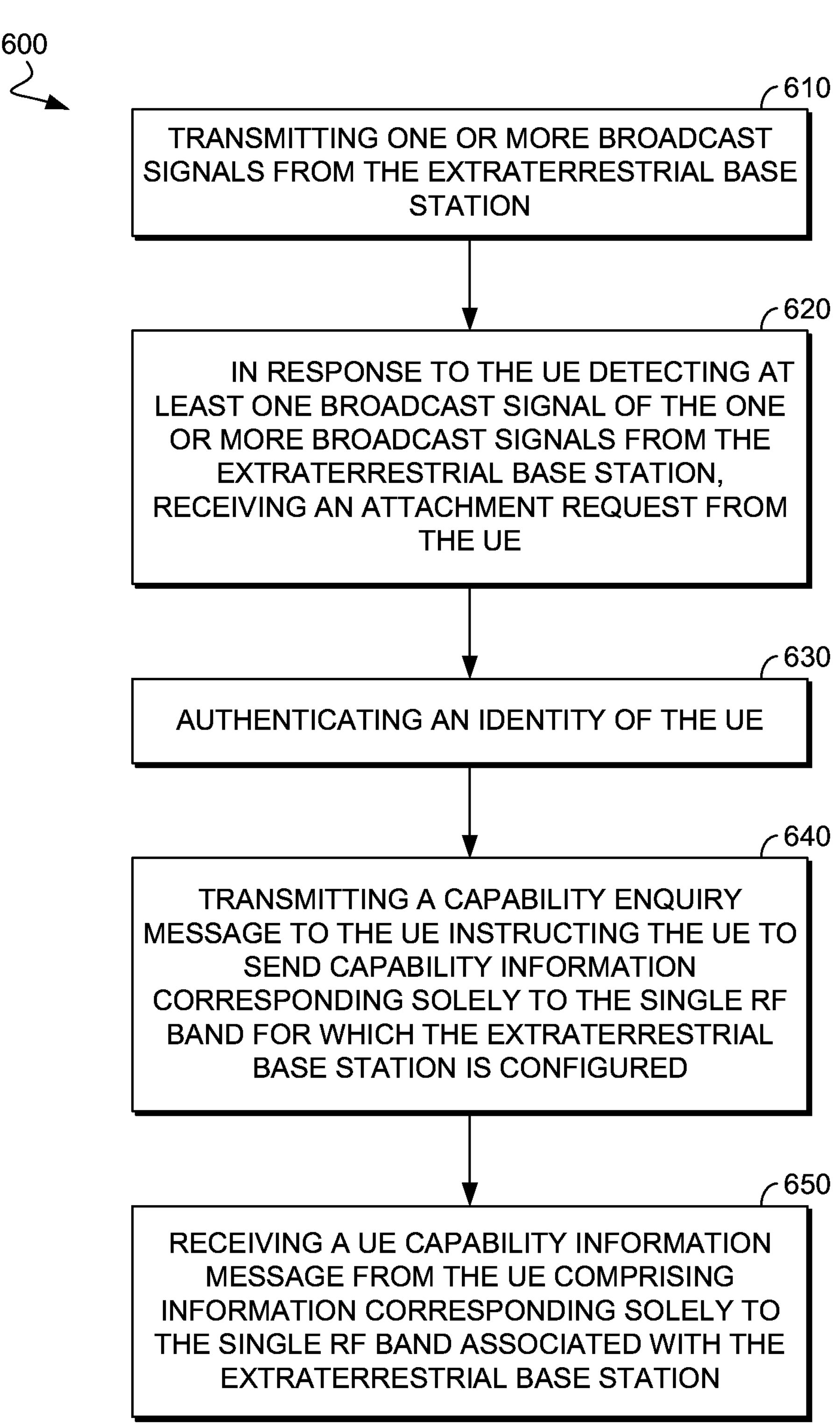
FIG. 6 illustrates depicts a flow diagram of an exemplary method, in accordance with embodiments described herein.

Turning now to FIG. 6, a flow chart representing a method 600 is provided. At a first step 610, one or more broadcast signals are transmitted from the extraterrestrial broadcast station. At a second step 620, in response to the UE detecting at least one broadcast signal from the one or more broadcast signals transmitted from the extraterrestrial base station, an attachment request from the UE is received. At a third step 630, the identity of the UE is authenticated. At a fourth step 640, a capability enquiry message is transmitted to the UE instructing the UE to send capability information corresponding solely to the single RF band for which the extraterrestrial base station is configured. At a fifth step 650, a UE capability information message from the UE comprising information corresponding solely to the single RF band associated with the extraterrestrial base station is received. While not shown, the method may further include granting permission to the UE to attach to the EBS. Additionally, in some aspects, the method may further comprise transmitting a message to the UE indicating that it is approved to attach to the EBS.

Figure 7:
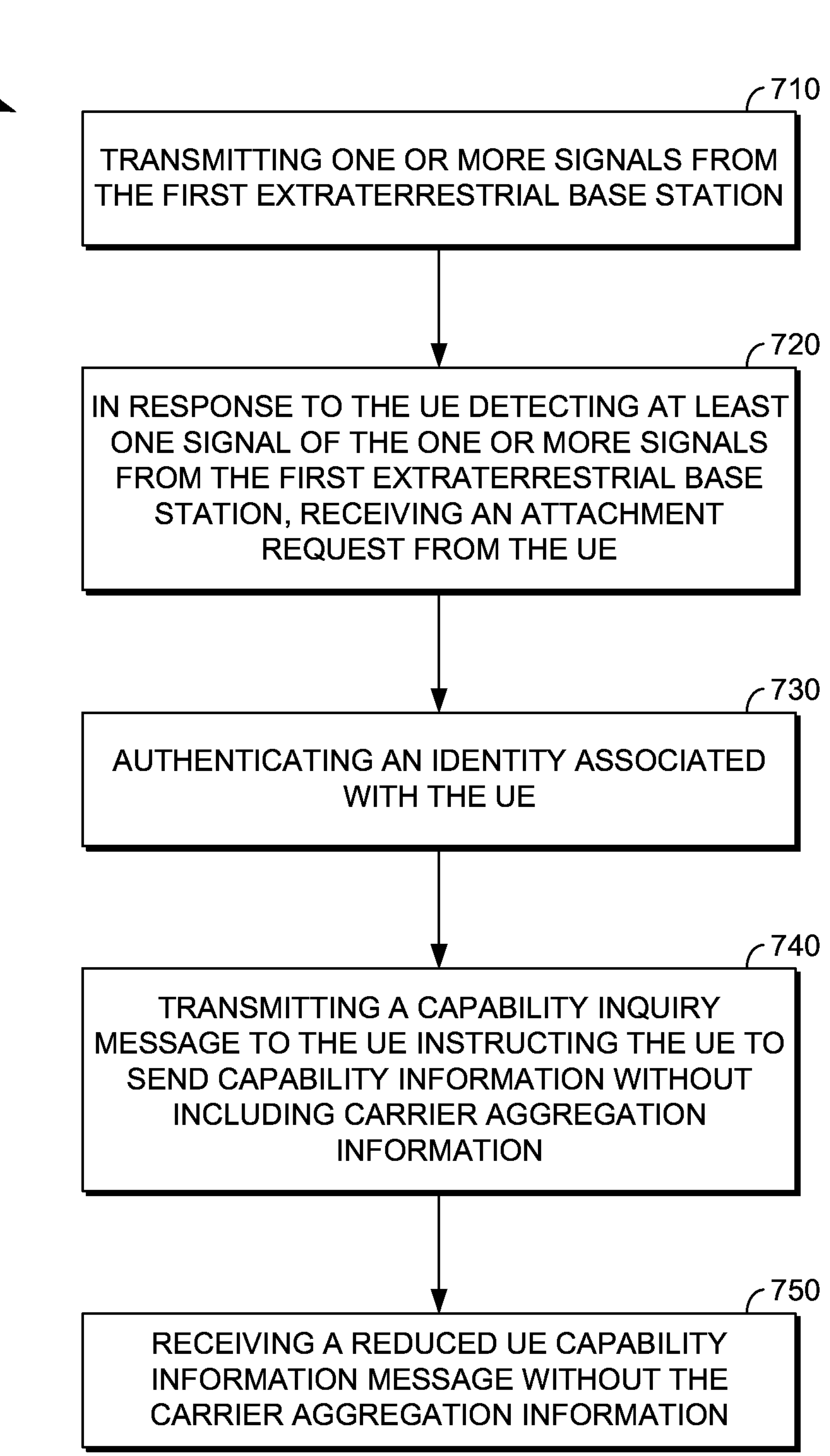
FIG. 7 depicts a flow diagram of another exemplary method, in accordance with embodiments described herein.

Turning to FIG. 7, a flow chart representing method 700 is provided. At a first step 710, one or more broadcast signals are transmitted from the extraterrestrial broadcast station. Then, at step 720, in response to the UE detecting at least one broadcast signal from the one or more broadcast signals transmitted from the extraterrestrial base station, an attachment request from the UE is received. Following this, the identity associated with the UE is authenticated at step 730. Then, at step 740, a capability enquiry message is transmitted to the UE instructing the UE to send capability information without including carrier aggregation information. At step 750, a reduced UE capability information message without the carrier aggregation information is received. In aspects, upon receiving the UE capability information message, the method may further include transmitting a message to the UE indicating it is approved to attach to the EBS and confirming that the US has attached to the EBS. Additionally, while not shown, the method may include the UE attempting to locate a terrestrial base station for attachment prior to sending the attachment request to the EBS.

Figure 8:
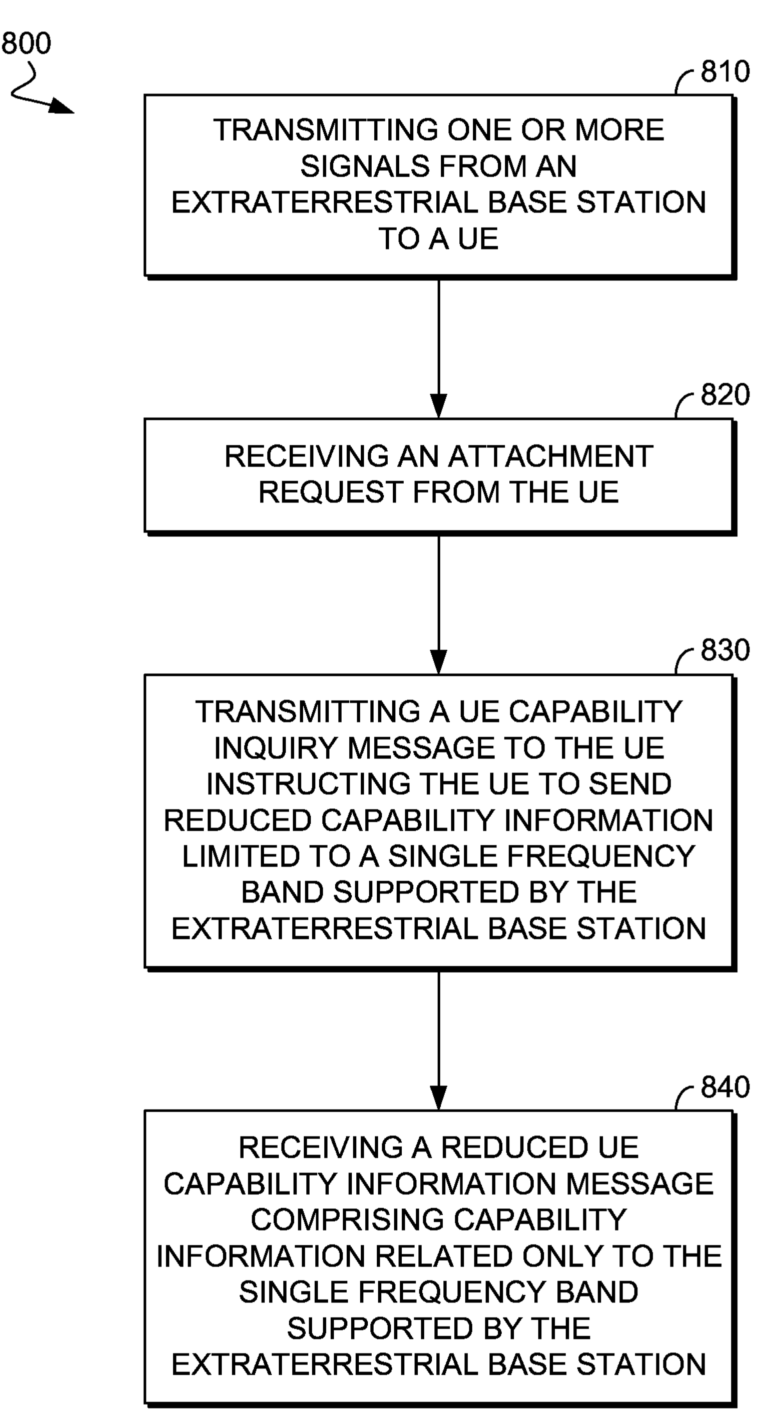
FIG. 8 depicts a flow diagram of yet another exemplary method, in accordance with embodiments described herein.

Turning to FIG. 8, a flow chart representing method 800 is provided. At step 810, one or more signals from the EBS to a UE are transmitted. The EBS and UE may communicate using LTE. At step 820, an attachment request from the UE in response to the UE detecting the one or more signals is received. At step 830, a UE capability enquiry message is transmitted to the UE instructing the UE to send reduced capability information limited to the one frequency band supported by the extraterrestrial base station. In aspects, the capability enquiry message may enquire whether the UE supports the same band as the EBS. At step 840, a reduced UE capability information message comprising capability information related only to the at least one frequency band supported by the extraterrestrial base station is received. The UE capability information message may include a response either confirming or denying that it supports the same band as the extraterrestrial base station. Additionally, in aspects, the EBS may grant permission to the UE to attach to the EBS and confirm that the UE has attached to the EBS as directed.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for reducing user equipment (UE) capability messaging received by an extraterrestrial base station comprising:

transmitting one or more reference signals from the extraterrestrial base station;

receiving an attachment request from the UE as a result of the UE failing to connect to a terrestrial base station;

transmitting a capability enquiry message to the UE comprising signaling instructional elements that instruct the UE to send capability information without including carrier aggregation information, wherein the capability enquiry message includes a plurality of questions related to capabilities supported by the extraterrestrial base station, including whether the UE supports a specific band identified in the capability enquiry message; and receiving a reduced UE capability information message without the carrier aggregation information from the UE, wherein the UE capability information message comprises information related to the specific a single RF band supported by the extraterrestrial base station, and wherein the UE capability information message includes a response either confirming or denying that the UE supports the specific band identified in the capability enquiry message.

2. The method of claim 1, wherein prior to sending the attachment request to the extraterrestrial base station, the UE attempts to locate the terrestrial base station for attachment.

3. The method of claim 2, wherein the UE utilizes mobile network code (MNC) that provides a ranking of base stations for attachment.

4. The method of claim 1, further comprising transmitting a message to the UE indicating it is approved to attach to the extraterrestrial base station and confirming that the UE has attached to the extraterrestrial base station.

5. The method of claim 4, wherein extraterrestrial base station communicates with the UE using eNodeB.

6. A system for reducing user equipment (UE) capability messaging received by an extraterrestrial base station comprising:

the extraterrestrial base station configured to broadcast signals on a single RF band for a single carrier and including one or more computer processing components configured to perform operations comprising:

transmitting one or more reference signals from the extraterrestrial base station;

in response to a UE detecting at least one reference signal from the extraterrestrial base station and as a result of the UE failing to connect to a terrestrial base station, receiving an attachment request from the UE;

transmitting a capability enquiry message to the UE comprising signaling instructional elements that instruct the UE to send capability information without including carrier aggregation information, wherein the signaling instructional elements include a plurality of questions related to capabilities supported by the extraterrestrial base station, including whether the UE supports the single RF band identified in the capability enquiry message; and receiving a UE capability information message without carrier aggregation information from the UE, wherein the UE capability information message comprises information related to the single RF band supported by the extraterrestrial base station, and wherein the UE capability information message includes a response either confirming or denying that the UE supports the single RF band identified in the capability enquiry message.

7. The system of claim 6, wherein the UE is configured to support multiple RF bands and carrier aggregation combinations.

8. The system of claim 6, wherein the extraterrestrial base station communicates with the UE using LTE.

9. The system of claim 6, wherein the extraterrestrial base station authenticates the UE prior to transmitting the capability enquiry message.

10. The system of claim 6, wherein the extraterrestrial base station does not support carrier aggregation.

11. The system of claim 6, wherein the UE attaches to the extraterrestrial base station after the extraterrestrial base receives the UE capability information message.

* * * * *